Dec. 14, 1937.  C. M. HURD  2,102,464
CLOSURE CAP LOCK
Filed April 21, 1936  2 Sheets-Sheet 1
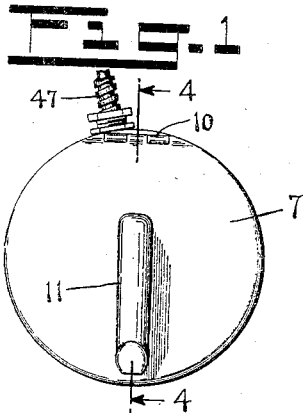
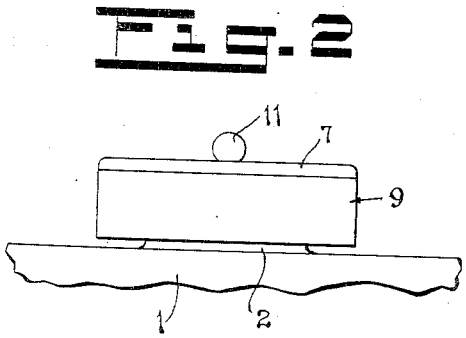
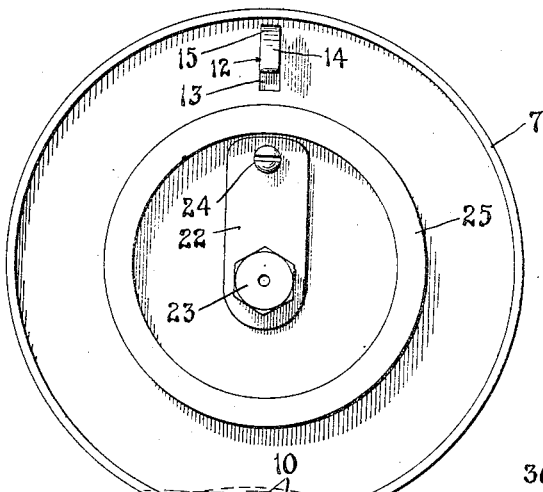
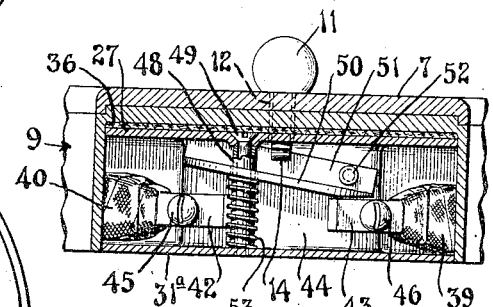
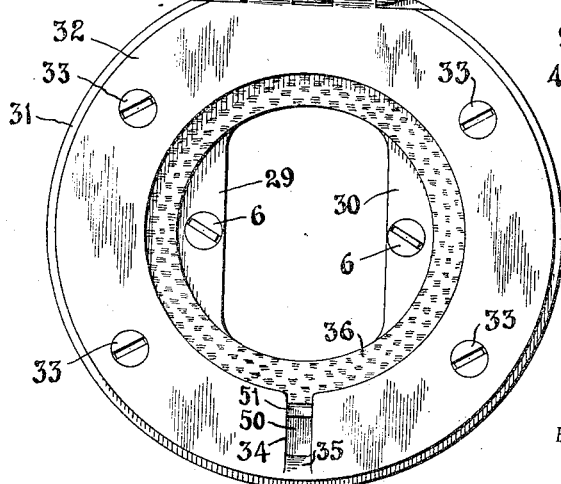
INVENTOR.
Clarence M. Hurd
BY Darby & Darby
ATTORNEYS Dec. 14, 1937.   C. M. HURD   2,102,464
CLOSURE CAP LOCK
Filed April 21, 1936   2 Sheets-Sheet 2
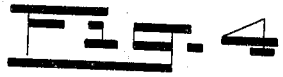
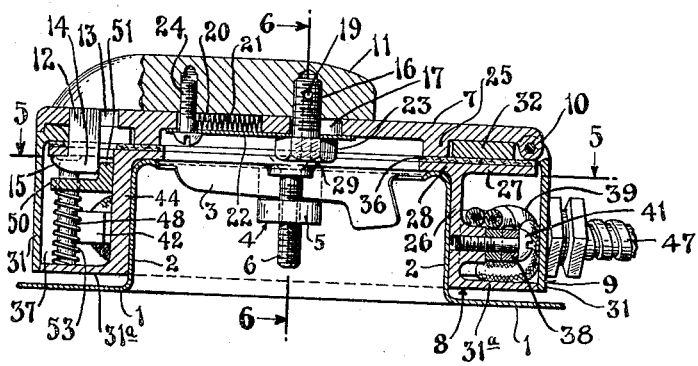
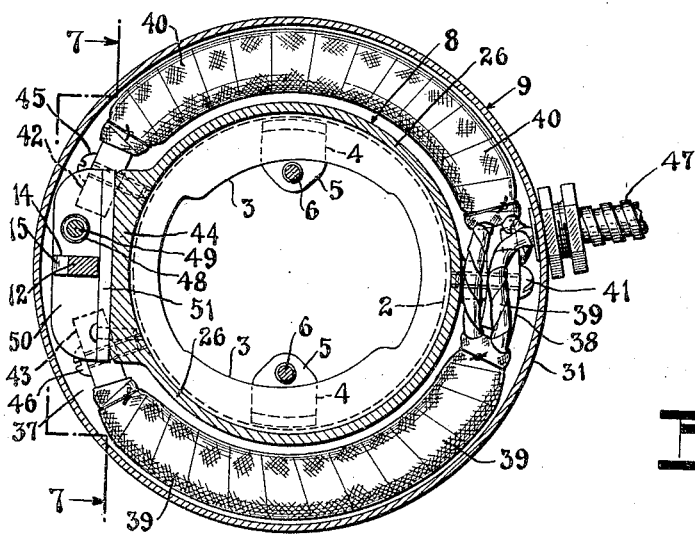
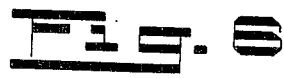
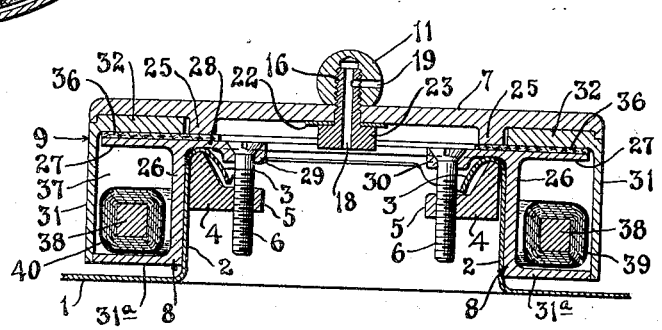
INVENTOR.
Clarence M. Hurd
BY Darby & Darby
ATTORNEYS Patented Dec. 14, 1937

2,102,464

UNITED STATES PATENT OFFICE 2,102,464

CLOSURE CAP LOCK

Clarence M. Hurd, Huntington, N. Y.

Application April 21, 1936, Serial No. 75,519

12 Claims. (Cl. 292—144)

This invention relates to closure caps for gasoline supply tanks and has for its principal object the provision of a gasoline tank closure cap construction which includes a releasable locking mechanism which normally maintains the cap in a closed and locked condition, and an electro-magnetic means which effects the releasing of said locking mechanism when it is desired to open said cap.

A further object of the invention is to provide a closure cap construction for gasoline supply tanks, of the character above referred to, and which may be readily and easily applied to the usual type of filler neck employed on said tanks and wherein the electro-magnetic lock releasing means may be controlled at a point remote from the tank.

A further object of the invention is to provide a closure cap of the character above referred to which is simple and compact in construction, inexpensive to manufacture and easy to install upon a gasoline supply tank.

With these and other objects in view, I will now describe my invention in connection with the attached drawings in which;—

Figure 1 is a top plan view of a closure cap for a gasoline supply tank made in accordance with my invention;

Fig. 2 is an elevational view of the closure cap showing it applied to the filler neck of a gasoline tank;

Fig. 3 is a plan view of the closure cap with the lid portion thereof shown in open position;

Fig. 4 is a sectional view taken on the line 4—4 in Figure 1, looking in the direction of the arrows;

Fig. 5 is a sectional view taken on the line 5—5 in Fig. 4 and looking in the direction of the arrows;

Fig. 6 is a cross sectional view of Fig. 4 taken on the line 6—6 and looking in the direction of the arrows;

Fig. 7 is a partial sectional view taken on the line 7—7 in Fig. 5 and looking in the direction of the arrows.

Referring to the drawings in detail wherein like characters of reference denote corresponding parts in the several views, the reference numeral 1 indicates a gasoline supply tank. The filler neck of the tank is indicated at 2 and is provided with the usual bent over cap locking top portions 3.

In carrying out the objects of my invention, I provide a pair of block members 4 which are adapted to be fitted under the bent over top portions 3 of the filler neck, said block members being formed with flange portions 5 through which is provided a screw threaded opening adapted to receive the screws 6. The closure cap construction made in accordance with my invention is adapted to be secured to the filler neck of the gasoline tank by the means of the above referred to blocks as will be more fully explained hereinafter.

The closure cap structure comprises in general a closure lid 7 and a housing formed of a sleeve member indicated generally at 8 and an outside housing member indicated generally at 9.

The closure lid 7 is adapted to be hinged to the outside housing member 9 by means of a suitable hinge 10 (see Figs. 3 and 4).

Mounted on the outer face of the closure lid is a sliding lock member 11. Said lock member is formed at one end with a downwardly projecting hook portion 12 which projects through a slotted opening 13 formed in the closure lid. The hooked end 14 of the hook portion is beveled as at 15 to permit the easy entry of the hook into a slotted opening in the housing when the lid is closed down on the closure structure as will be hereinafter more fully explained. Also secured to the sliding member 11 and adjacent its other end is the screw threaded stud 16 which also projects downwardly through a slotted opening 17 in the lid. The stud 16 has a central opening 18 therethrough which communicates with an opening 19 provided in the sliding member 11. The purpose of the openings through the stud and in the sliding member is to provide ventilation to the tank when the closure cap lid is closed.

The closure lid is also provided with an elongated slot 20 which is adapted to receive and house a spring 21. The spring 21 is retained in slot 20, and the sliding member 11 is held to the closure lid, by means of a plate 22 which is slidingly secured to the under face of the lid by means of a centrally apertured nut 23 secured to the lower end of stud 16 which extends through an opening in one end of said plate and by a bolt 24 which extends upwardly through the other end of said plate, and through slotted opening 20, and is secured to the under face of the sliding member.

The spring 21 when positioned in the slot 20 has one end thereof in engagement with the end of the slot, and the other end engaging against the bolt 24. It will be seen by this construction and arrangement that the sliding member 11 will be slidingly held to the lid and the bolt 24, the hook portion 12 and the stud 16, will be normally held by the action of spring 21 against the bolt 24, towards the forward ends of their respective slots in the lid and in order to move the hook portion 12 rearwardly in its slot, it is necessary to force the sliding member 11 rearwardly towards the center portion of the lid and so bolt 24 will be moved against the action of the spring 21.

The under face of the closure lid 7 has formed thereon the raised metallic ring 25. The purpose of said ring will be more fully explained hereinafter.

The sleeve member 8 of the housing of the closure structure is formed with a sleeve portion 26 which is adapted to fit around and encase the filler neck 2 of the gasoline tank. The upper end of the sleeve portion is formed with a laterally extending flange plate which has a branch 27 extending outwardly from the sleeve portion and a branch 28 which extends inwardly therefrom and fits over the top edge of the filler neck 2. The outer edge portion of the branch 28 of the upper flange plate of said sleeve portion is formed with depressed portions 29 and 30 which are provided with openings therein adapted to receive the screws 6. In securing the closure structure to the filler neck, the block members 4, above described, are fitted under the bent over portion of the filler neck so that the screw threaded openings therein coincide with the openings in the depressed portions 29 and 30 of the flange plate of the sleeve member, and the screws 6 are inserted through said openings and the block members drawn up tightly under said turned over portions of the neck. This will securely fasten the sleeve member to the filler neck.

The lower end of the sleeve portion 26 of the sleeve member 8 is formed with an outwardly extending flange 31a.

The outside housing member 9 of the closure structure is comprised of a side portion 31 formed at its upper end with a laterally extending flange 32. The flange 32 of the outside housing member, when the closure structure is in assembled condition, extends over the top face of the branch 27 of the upper flange plate of the sleeve member 8 and is secured thereto by means of the screws 33. The flange 32 is also provided with a slot 34 through which the hook portion 12 of the sliding member 11 is adapted to project when the lid 7 is in closed position. The forward end 35 of said slot is beveled, as indicated in Figure 3, to receive the beveled end 15 of hook portion 12.

Between the flange 32 of the outside housing 9 and the upper flange plate of the sleeve member 8 there is provided a suitable gasket 36. The outer portion of the gasket 36 extends beyond the edge of flange 32 as shown in Figure 3 and is adapted to be engaged by the ring 25 formed on the under face of lid 7 so that a tight fit of the lid with the closure structure will be effected when the lid 7 is in closed position.

It will be seen that when the outside housing member 9 is assembled with respect to the inside sleeve member 8 there is formed a circular closed compartment or casing 37 in the closure structure. In this compartment or casing is positioned an electro-magnet comprised of the iron core 38 surrounded by the coils 39 and 40. The iron core is secured to the sleeve portion 26 of the sleeve member 8 at the rear of the closure structure by means of a brass screw 41. The exposed ends 42 and 43 of the core are secured to a brass plate 44 which is mounted on the front portion of the sleeve portion 26, by means of brass screws 45 and 46. The brass plate 44 may be secured to the sleeve portion 26 in any desired manner.

The electro-magnetic coils 39 and 40 are connected in an electrical circuit (not shown) through the medium of conductors which extend through an opening formed in the outside casing member and through a conduit 47 secured to said casing member. It is of course understood that in said electrical circuit there is employed a usual switching means for opening and closing the circuit.

Mounted in the forward portion of the closure structure and in the casing or compartment 37 adjacent to the ends 42 and 43 of the electro-magnet core is the brass tube 48 which is held in a vertical position by means of a screw threaded bolt 49 which extends downwardly through the branch 27 of the sleeve member 8 and through the tube 48 and has its end secured in the metal of the lower flange portions 31a of said sleeve member 8.

Also positioned in the compartment or casing 37 and in the field of the exposed ends 42 and 43 of the magnet core, is the steel armature plate 50. The armature plate is formed with an upwardly extended flange portion 51 which is pivotally secured to the brass plate 44 by means of a stud 52. The armature plate 50 is provided with an opening therein at its free end through which the brass tube 48 extends. Positioned around the brass tube is a spring 53. The lower end of said spring 53 engages against the lower flange portion 31 of the sleeve member 8, and the upper end thereof engages against the under side of the armature plate 50. The spring normally causes the free end of the armature plate to be pushed upwardly. The upwardly extending flange portion 51 of the armature plate is positioned so that, when the plate is held upwardly by the action of spring 53, it will fit between the rear face of the hook 12 of the slide member and the outer face of the brass plate 44 when the lid is closed and the slide member is pushed in its forward position by the action of the spring 21 mounted in the lid 7. When the upwardly extended flange portion 51 of the armature plate is thus held in the above mentioned position, it effects a locking of the lid so that it cannot be opened as the hook member 12 is held with its hooked portion in engagement with the under side of the branch 27 of the sleeve member 7.

The electro-magnetic coils, in compartment 37, when energized by the closing of the electrical circuit will cause the core 39 to become magnetized and the exposed ends 42 and 43 of said core will attract the pivoted steel armature plate 50 and cause it to be moved downwardly against the action of the spring 53. When this occurs the upwardly extending flange portion 51 of the armature plate will be withdrawn from its position behind the rear face of the hook portion 12 and the hook portion may then be manually moved backwards in its slot 13 against the action of spring 21 in the lid 7 so that it will become disengaged from the extension 27 of the upper flange plate of the sleeve member 8 and the lid may then be raised so that access can be had to the gasoline tank.

When the electro-magnet is deenergized the spring 53 mounted around the brass tube 46 becomes active against the armature plate 50 and causes said plate to again be raised to its normal position. Then when it is desired to close and lock the lid, said lid is lowered and the hook portion 12 again is caused to enter the casing 37 through the slot 34 of the flange portion 32 of the outside casing member 9 and the forcing of the hook member into said slot 34 is aided by the beveled end 15 of the hook member and the beveled end 35 of the slot. After the hook member is received in the casing of the closure structure, the spring 21 in the lid acts to force the hook portion into locked position again.

From the above description it will be seen that I have provided an exceedingly sturdy and simple construction of a closure cap for gasoline tanks which may be applied to the filler neck of the tank as a complete unit and there is provided in the closure cap means for locking the same so that access to the tank is prevented, and electro-magnetic means for releasing the locking means when access to the tank is desired.

While it is to be understood that the closure cap construction described herein may be employed in connection with any type of gasoline supply tank, I have found that it is particularly adaptable for use on gasoline tanks carried by automotive vehicles and the operation of the electro-magnetic means for releasing the locking means can be readily controlled by the operator of the automotive vehicle by a switch means located on the instrument board of the vehicle.

Having thus described the invention, what is claimed as new is:

1. A closure cap construction for the filler neck of a gasoline tank comprising a housing member adapted to be secured to said filler neck, a lid hinged to the housing member and adapted to close the opening in said filler neck, slidable means mounted on said lid for engaging with said housing member when the lid is in a closed position, locking means positioned within said housing for normally holding said engaging means of the lid in locked relation to said housing member when said lid is closed, and electromagnetic means within said housing for effecting the release of said locking means from its locking position with respect to said slidable engaging means of the lid upon the closing of an electrical circuit.

2. A closure cap construction for the filler neck of a gasoline tank comprising a closed housing adapted to be secured to said filler neck and to surround the same, a lid hinged to said housing and positioned so that it will close the opening in said filler neck, a slidable lock mounted on said lid for engaging with the housing when the lid is in a closed position with respect to the housing, a locking means positioned within the housing so as to normally hold said lock in locked engagement with the housing when the lid is closed, and electro-magnetic means within said housing for effecting the release of said locking means from its locking position with respect to said slidable lock upon the closing of an electrical circuit.

3. A closure cap construction for gasoline tanks comprising a housing member, a lid hingedly secured to said housing member, a locking member associated with said lid and adapted to have a sliding locking engagement with said housing member when said lid is in closed position, means positioned in said housing member for holding said sliding locking member in locked engagement with said housing member when said lid is closed, and means in said housing member for releasing said last mentioned means from its holding relation with respect to said locking member when it is desired to open said lid.

4. A closure cap construction adapted to be secured to the filler neck of a gasoline tank and comprising a housing member adapted to encircle the filler neck, a lid for said housing member, a sliding locking means mounted on said lid for locking the same in a closed position with respect to said housing member, means positioned in said housing member for engaging with said sliding locking means when said lid is in closed position and for holding the same in locked engagement with said housing, and electrically controlled means in said housing for causing said engaging means to become released from its engagement with said locking means when it is desired to open said lid.

5. A closure cap construction for the filler neck of a gasoline tank, comprising a housing forming a closed chamber which surrounds said filler neck, means connected to said housing for securing the same to the filler neck, a lid hinged to said housing, a sliding lock associated with said lid and adapted to lock said lid in a closed position with respect to the housing, means positioned in the closed chamber of said housing for engaging with said lock and maintaining it in locked relation with respect to said housing when the lid is closed, and means operated by an electrical circuit also positioned in said housing chamber for causing said lock engaging means to become released from its engagement with said lock when it is desired to unlock the lid and open the same.

6. A closure cap construction for gasoline tanks having a filler neck, comprising a housing member adapted to be secured to the filler neck, a lid hinged to said housing member, a locking means slidably mounted on said lid and adapted to having a sliding locking engagement with said housing member when said lid is closed on said housing member, means positioned in said housing member for holding said locking means in locked engagement with respect to said housing member, and means for withdrawing said last mentioned means from its holding position so that said locking means may be released from its engagement with said housing member.

7. A closure cap construction for gasoline tanks comprising a housing, a lid hinged to said housing, a sliding lock associated with said lid and adapted to be slidingly engaged with said housing when said lid is closed, means in said housing normally positioned so that it will hold said lock in locked engagement with respect to said housing, and electro-magnetic means positioned in said housing for effecting the withdrawal of said lock holding means from its lock holding position when said electro-magnetic means is energized by an electrical circuit.

8. A closure cap construction for gasoline tanks having a filler neck, comprising a housing adapted to surround and to be secured to the filler neck, a lid hinged to said housing, a locking means mounted on said lid and having a locking member adapted to engage with said housing when the lid is closed and to lock said lid to the housing, an electro-magnetic means positioned in said housing for effecting the unlocking of said locking means from the housing when said electro-magnetic means is energized by an electrical current.

9. A closure cap construction for gasoline tanks provided with a filler neck comprising a housing member formed with a sleeve portion adapted to encase and to be secured to the filler neck and an outside housing portion adapted to be secured to said sleeve portion so as to provide a closed compartment, a lid hingedly secured to said housing member, a sliding locking means mounted on said lid and adapted to slidingly engage with said housing member when said lid is in closed position, electro-magnetic means mounted in said closed compartment of said housing member and connected in an electrical circuit outside of said housing member, and means positioned in said compartment and controlled by said electro-magnetic means for causing said locking means of said lid to be locked and unlocked with respect to said housing member.

10. A closure cap for gasoline tanks having a filler cap comprising a housing member formed with a sleeve portion adapted to fit around and be secured to the filler neck and with an outside housing portion secured to the sleeve portion to form a closed compartment around the filler neck when the closure cap is applied thereto, a lid hingedly secured to said housing member and adapted to close the closure cap, a locking member slidingly secured to said lid and formed with a locking means which slidingly engages with the housing member when said lid is closed, electro-magnetic means positioned in the closed compartment of said housing member and adapted to be connected in an electrical circuit outside of said closure cap, means positioned in said compartment and controlled by said electro-magnetic means for holding said locking means of said locking member in locked engagement with said housing member when the electrical circuit of said electro-magnetic means is open and to release said locking means when said circuit is closed.

11. A closure cap for gasoline tanks having a filler cap comprising a housing member formed with a sleeve portion adapted to fit around and to be secured to the filler neck and with an outside housing portion secured to the sleeve portion so as to form a closed compartment around the filler neck when the closure cap is applied thereto, a lid hingedly secured to said housing member and adapted to close said closure cap, a locking member slidingly secured to said lid and formed with locking means which is adapted to slidingly engage with and become locked to said housing member when said lid is closed, spring means in said lid for normally maintaining said locking means in locking engagement with said housing member, electro-magnetic means positioned in the closed compartment formed in said housing member and adapted to be connected in an electrical circuit outside of said closure cap construction, means positioned in said compartment and controlled by said electro-magnetic means for causing said locking means to be held in locked or unlocked engagement with said housing member, means for causing said lock holding means to lock said locking means with respect to the housing member when the electrical circuit of said electro-magnetic means is open.

12. A closure cap construction for the filler neck of a gasoline tank comprising a closed housing formed of a sleeve portion which is adapted to fit around the filler neck and which is provided with upper and lower laterally extending flanges, and an outer housing portion provided with a laterally extending flange which is adapted to be secured to the upper flange of said sleeve portion, a lid hinged to the housing and adapted to close the opening in said filler neck, slidable means mounted on said lid adapted to have a sliding locking engagement with said housing when said lid is closed, a locking means pivotally positioned within said housing and adapted to lock said slidable means to said housing, means for normally maintaining said locking means in its locking position with respect to the slidable means when the lid is in closed position, and electro-magnetic means positioned within the housing for withdrawing said locking means from its locking position with respect to said slidable means upon the closing of an electrical circuit.

CLARENCE M. HURD.